Sept. 1, 1953    O. L. WILKINSON ET AL    2,650,616
SOLENOID OPERATED PILOT VALVE AND MAIN GATE VALVE
Filed Aug. 30, 1948

INVENTORS
ORVILLE L. WILKINSON
OTIS A. WRIGHT

BY
ATTORNEY

Patented Sept. 1, 1953

2,650,616

UNITED STATES PATENT OFFICE 2,650,616

SOLENOID OPERATED PILOT VALVE AND
MAIN GATE VALVE

Orville L. Wilkinson, Tujunga, and Otis A. Wright, Burbank, Calif., assignors, by mesne assignments, to Hydro-Aire, Inc., a corporation of California Application August 30, 1948, Serial No. 46,764

1 Claim. (Cl. 137—657)

Our invention relates to a simple valve device of varied utility but having a special utility in jet driven aircraft as a means for controlling a flow of compressed air to the turbine driven after burner which is a device employed to feed fuel to the exhaust portion of the jet engine of the aircraft for the purpose of producing excess speed or increased power for short periods of time.

The feeding of fuel to the exhaust portion of the jet engine results in high temperatures which can be maintained for only relatively short periods of time if injury to or destruction of the exhaust end of the engine is to be avoided.

It is an object of the present invention to provide a shutoff valve for controlling the supply of compressed air to the operating turbine of the after burner, which shutoff valve is normally maintained closed, and is opened by application of operating force which is under manual control, and which valve is automatically closed whenever the operating force is off or is diminished below a value sufficient to accomplish opening of the shutoff valve.

It is an object of the invention to provide a shutoff valve of this character having a gate normally held in closed position by spring means, there being a servomotor actuated by fluid pressure to open the gate against the closing force of the spring means, and there being a pilot valve for controlling the application of fluid pressure to the servomotor, this pilot valve being normally held by a spring element in a position to release fluid pressure from the servomotor. The pilot valve is arranged to be moved by a magnetic device, such as a solenoid, so as to permit fluid pressure to be applied to the servomotor. Should there be a failure of energization of the magnetic device, the spring element associated with the pilot valve will move the same into position to release fluid pressure from the servomotor so that the spring means associated with the gate will move the gate into closed position.

It is a further object of the invention to provide a valve device of the character set forth in the foregoing having a shutoff valve which is urged into closed condition by spring means, the aforesaid pilot valve embodying a chamber having diametrally opposed inlet and outlet ports, and a poppet having a closure to close the fluid inlet port and a closure to close the outlet port when the poppet is shifted against the force of a spring away from its position wherein the inlet port is closed. The solenoid functions to exert a force to move the pilot valve poppet against the action of the associated spring so as to close the outlet port and open the inlet port, the spring automatically returning the poppet to its initial position when the operating force is removed.

It is also an object of the invention to provide a shutoff valve device of this character having its cooperating parts arranged so as to be included in a single unitary structure of compact form.

Further objects and advantages of the invention will be brought out in the following part of the specification wherein we have described details of a preferred embodiment of our invention for the purpose of making a complete disclosure without limiting the scope of the invention defined by the claim.

Referring to the drawings, which are for illustrative purposes only,

Figure 1:
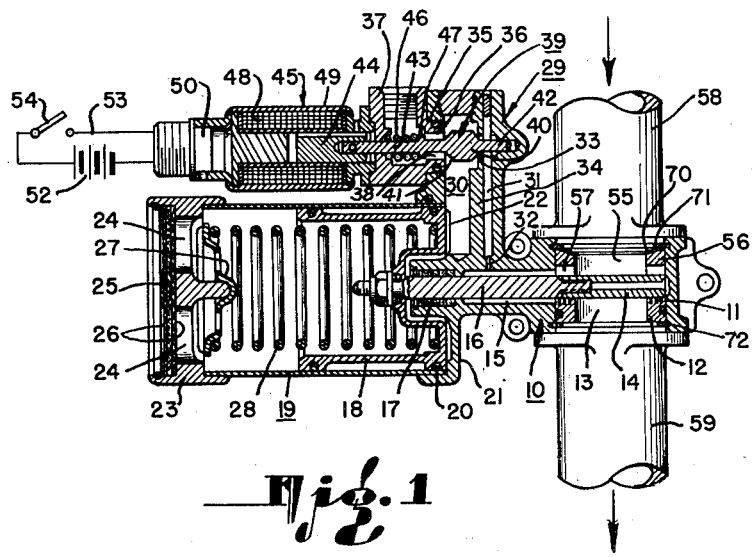
Fig. 1 is a sectional view through a preferred embodiment of our invention, showing the shutoff valve closed.

The valve device includes a main valve body 10 having a cylindric bore 11. An annular valve seat 12 is disposed in the lower portion of the bore 11 to define an outlet 13 for the valve body 10. A circular disc gate 14 cooperates with the seat 12 to close the outlet 13. The body 10 is provided with a radially projecting gate chamber 15 into which the gate 14 may be retracted when it is moved off the seat 12. A valve stem 16 extends from the gate 14 through the chamber 15 and through packing 17 carried at the outer end of the chamber 15.

A cylindric piston 18, secured on the outer end of the stem 16, operates in a cylinder 19, mounted on the body 10 so as to provide a fluid servomotor for moving gate 14. The cylinder 19 has one end mounted in a cylinder head 21 of body 10, and sealed thereto by a sealing ring 20. The piston 18 and the cylinder 19 cooperate to form a chamber 22 to receive fluid under pressure. The piston 18 comprises a wall of this chamber 22 which is moved by fluid pressure applied in the chamber 22, so as to carry the gate 14 off the seat 12 and into the open position shown in Fig. 2. A cap 23 is secured on the outer end of the cylinder 19, this cap having openings 24 which are protected by a fibrous wall 25 confined between screens 26, thereby disposing across the openings 24 a filter to prevent entry of dust into the cylinder 19. The cap 23 carries therein a spring support 27. A compression spring 28 is compressed between this support 27 and the piston 18, and continuously exerts a force against the piston 18 in valve closing direction.

The body 10 has an extension 29 which has therein a duct 30, which is in unrestricted communication with the chamber 22. The extension 29 has a passage 31 which communicates with the chamber 15 through a port 32 of reduced diameter. An inlet port 33 is formed in the wall 34 of the extension 29 to connect the passage 31 and the duct 30.

The extension 29 has in diametrally opposed relation to the inlet port 33 an opening 35 which receives a portion 36 of an outlet fitting 37 which is secured to the extension 29 of the body 10, this fitting 37 having therein an outlet port 38 of larger diameter than the inlet port 33. The ports 33 and 38 cooperate with a double valve poppet 39 in forming a pilot valve for the application to and release of fluid pressure from the chamber 22. The poppet 39 is disposed in the duct 30 between the ports 33 and 38, and has thereon a closure 40, referred to as the inlet closure, which closes the inlet port 33 when the poppet 39 is shifted into the position shown in Fig. 1. On the opposite end of the poppet 39 there is an outlet closure 41 which is disposed in spaced relation to the outlet port 38 when the closure 40 is in a position to close the inlet port 33. Guide stems 42 and 43 extend oppositely from the poppet 39 respectively through the ports 33 and 38. The stem 43 extends through the cavity of the outlet fitting 37, and on its other end receives an armature 44 forming a part of a magnetic force applying means 45 shown as a solenoid. A compression spring 46 is disposed around the portion of the stem 43 within the outlet fitting 37 and continuously exerts a force against a shoulder 47 on the stem 43 to urge the poppet 39 in the direction for inlet closure 40 thereof to close the inlet port 33 (a normal position). The solenoid 45 has a winding 48 enclosed by a housing 49, which has an electrical fitting 50 through which the winding 48 may be connected with a source of electric current shown as a battery 52, by means of the conductors 53 and a swtch 54.

The chamber 15 of the body 10 communicates with the inlet opening 55 defined by a hold down ring 56 disposed in the bore 11 of the body 10 on the upstream side of the gate 14, this ring having slots or passages 57 to connect the chamber 15 with the inlet opening 55. In the use of the valve device piping 58 containing air under pressure is connected to the upper face of the body 10, and piping 59 is connected to the lower face of the body 10 for conducting air under pressure when the shutoff valve is opened, to the air driven motor or turbine of the auxiliary fuel supply system or after burner of the jet engine. The ring 56 is urged downwardly by a dished annular spring 70 secured by a snap ring 71 positioned within the upper portion of the bore 11, and the annular valve seat 12 is held in the bore 11 by a snap ring 72. The positions of the members 12 and 56 may be reversed in the bore 11 of the body 10 if it is desired to reverse the direction of flow of air through the shutoff valve.

When a flow of compressed air through the shutoff valve of the device is desired, for the purpose of producing a feeding of auxiliary fuel to the jet engine of the aircraft, the switch 54 is manually closed by the pilot thereby energizing the solenoid 45 so that the armature 44 thereof is attracted, moving the pilot valve poppet 39 against the force of the spring 46 to carry the closure 40 away from the inlet port 33 and bring the closure 41 in a position to close the outlet port 38. Then compressed air flows from the chamber 15 through the passage 31 and the inlet port 33 into the chamber 30, building up in the chamber 22 a fluid pressure which acts against the piston 18 to move the same against the force of the spring 28, with the result that the gate 14 is carried off the seat 12 from the position shown in Fig. 1 and into the position shown in Fig. 2, to open the shutoff valve. This shutoff valve will be held open so long as the solenoid 45 is electrically energized and exerts an actuating force on the poppet 39 to hold it in the leftward position in which it is shown in Fig. 2.

Figure 2:
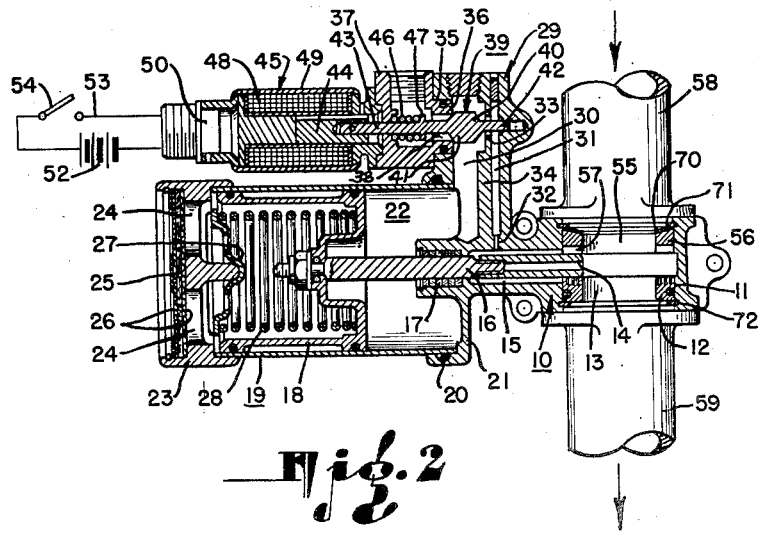
Fig. 2 is a sectional view similar to Fig. 1 but showing the device operated so that the shutoff valve is opened.

In event of opening of the switch 54 or of failure of the electrical system which supplies current to the winding 48 of the solenoid 45, deenergization of the solenoid 45 will occur, which will release the operating force from the poppet 39, and the spring 46 will move the poppet 39 rightwardly from the position in which it is shown in Fig. 2 back to the position in which it is shown in Fig. 1. This will close the inlet port 33 and open the outlet port 38 and release the pressure from the chamber 22 so that the spring 28 may act to move the gate 14 into a position to close the outlet opening 13 of the valve seat 12.

An important feature of the invention is that the operating mechanism substantially and instantaneously closes the gate 14 when the solenoid 45 is deenergized. In the form of the invention shown herein the inlet port 33 is of such size that when the poppet 39 is moved to open port 33, the rate of flow of air under pressure into the chamber 22 will be such as to open the gate 14 in one-half to one second, depending upon pressure of air in the chamber 15. The outlet port 38 being considerably larger, the discharge of air from the chamber 22 is relatively rapid, when the poppet 39 is returned to its normal position, and closing of the gate 14 is accomplished in about one-tenth second.

If desired the solenoid 45 may be provided with a latching mechanism whereby it may be latched in either position, in which event current failure will not affect the position in which the solenoid has been latched.

We claim as our invention:

In a shutoff valve: a servomotor comprising a cylinder and a piston therein; a combined valve housing and cylinder head comprising an annular valve body having coaxial, axially spaced valve seats defining an inlet and an outlet respectively, said body having on one side a radially projecting integral portion defining a space which communicates with the space between said valve seats, with both spaces being aligned and lying in a common plane at right angles to the axis of said valve body, to provide a valve chamber, said cylinder head constituting an integral extension of said radially projecting portion of the valve body, with the axis of said head lying in said common plane and constituting an extension of a radius of said annular valve body, and a pilot valve casing constituting an integral extension of one side of said cylinder head and projecting radially therefrom, said pilot valve casing and cylinder head having an unrestricted exhaust duct extending therein radially of the cylinder axis, with the inner end of said duct in direct communication with the interior of said cylinder in said cylinder head, and having a restricted passage extending therein parallel to said duct and opening into said valve chamber through said radially projecting portion of the valve body, and said pilot valve casing having a pilot valve chamber at the outer end of said duct, having an inlet port between said passage and duct, and an outlet port aligned with said inlet port on the opposite side of said duct from the inlet port, on an axis parallel to said cylinder axis; a pilot valve poppet in said pilot valve chamber, movable in opposite directions to close either said inlet or said outlet port; a solenoid for actuating said pilot valve; and a gate valve slidable in said first mentioned valve chamber and between said valve seats, said gate valve having a stem extending through said cylinder head and connected to said piston; said restricted passage communicating with the inlet side of said valve gate to receive from the inlet of said valve body, pressure fluid which, when said pilot valve inlet port is open, will flow gradually into said duct and thence into said cylinder to move said piston in the direction to open said gate valve; and spring means acting against said piston and operable thereon to rapidly move the gate valve to closed position as the result of quick release of fluid pressure from the cylinder through said duct and outlet port when the pilot valve is in its other position.

ORVILLE L. WILKINSON.
OTIS A. WRIGHT.

References Cited in the file of this patent

UNITED STATES PATENTS

| Number | Name | Date |
|---|---|---|
| 404,361 | McFeeley | May 28, 1889 |
| 687,247 | Marrder | Nov. 26, 1901 |
| 798,551 | Willits | Aug. 29, 1905 |
| 1,710,771 | Gardiner | Apr. 30, 1929 |
| 1,886,366 | Bailey | Nov. 8, 1932 |
| 2,266,871 | Krogh | Dec. 23, 1941 |
| 2,399,553 | Lindsay | Apr. 30, 1946 |

FOREIGN PATENTS

| Number | Country | Date |
|---|---|---|
| 609,081 | France | May 3, 1926 |